May 12, 1970      J. T. FOSTER      3,511,559
LIGHT TRANSMITTING AND DISTRIBUTING DEVICE
Filed July 20, 1967
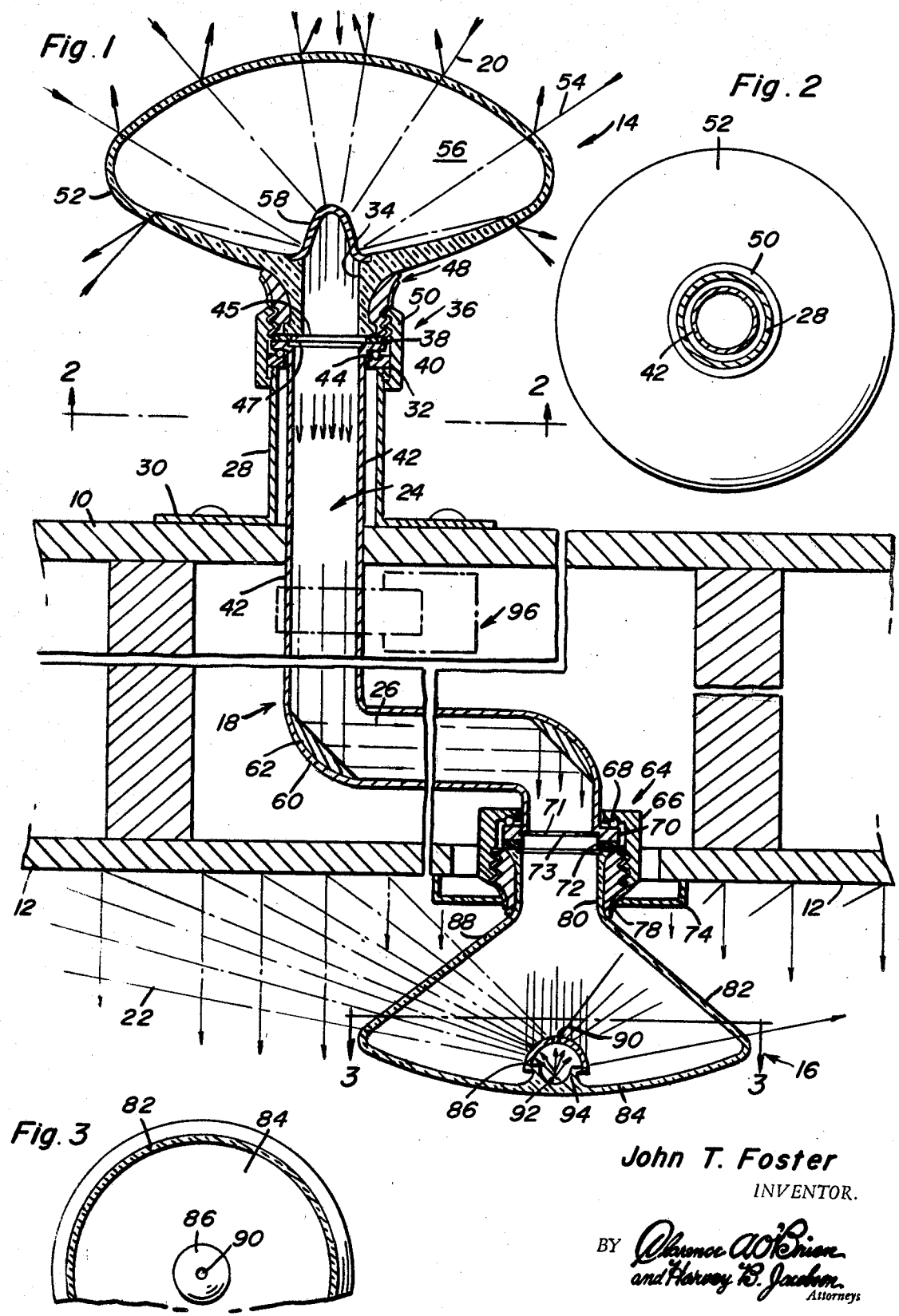
John T. Foster
INVENTOR.

United States Patent Office 3,511,559
Patented May 12, 1970

3,511,559
LIGHT TRANSMITTING AND DISTRIBUTING
DEVICE
John T. Foster, 2202 Mulberry Blvd.,
Tallahassee, Fla. 32303
Filed July 20, 1967, Ser. No. 654,849
Int. Cl. G02b 17/00
U.S. Cl. 350—258        9 Claims

ABSTRACT OF THE DISCLOSURE

The visible light rays enter an evacuated chamber enclosed within a light filtering housing of a receiver mounted on a building. The light rays are refracted within the receiver chamber into collimated light conducted to a distributor within the building through rigid tubing secured by sealing connections to the receiver and the distributor. The distributor chamber is enclosed by a transparent protective housing internally mounting a reflector from which the light is directed upwardly onto the ceiling.

---

This invention relates to the collection of visible light energy from solar radiation and the distribution thereof internally of a building for illumination purposes.

The use of solar radiation for internal illumination purposes has been proposed and many arrangements devised toward that end. These arrangements usually involve a receiver mounted on the roof of a building so as to collect radiation energy, a distributor mounted internally of the building from which radiation is emitted and a conductor providing an extended optical path through which the light energy is transmitted from the receiver to the distributor. Such lighting systems have not been adopted however because of serious drawbacks including installational expense, maintenance problems and susceptibility to the adverse affects of weather as well as functional inadequacies.

Interior lighting systems utilizing solar radiation as a source of light energy have also proven to be unsatisfactory because of fluctuations in the light intensity resulting from changes in weather.

In accordance with the present invention, the lighting system features an energy receiver fixedly mounted in spaced relation to the roof portion of a building and so shaped as to receive light radiation from all directions while minimizing direct solar radiation in order to achieve a uniform flow of light energy. Further, the receiver filters radiation as far as possible so as to admit only radiation within the visible wave-length range. Undesirable radiation is thereby minimized.

The receiver and distributor components associated with the present invention enclose evacuated chambers interconnected by rigid tubing through which the light energy is conducted so as to exclude moisture and dust. As a result thereof, dispersion of light by particles that would otherwise enter the system is avoided and air pressure build-up due to heat is minimized. Further, a gradual reduction in reflexivity of reflective surfaces due to coating and corrosion will be avoided.

The distributor component associated with the light system, features an internally mounted, hemisphercal reflector by means of which the collimated light entering the distributor is laterally dispersed in an upward direction. A light diffusing element is mounted below the reflector in optical alignment with an aperture formed therein regulating the brightness ratio of the light emerging from the distributor. An intensity regulating control may also be provided in association with the light conducting tubing through which the flow of energy to the distributor is interrupted in order to reduce the illumination level as desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a partial side sectional view through a typical installation within which the solar lighting device of the present invention is installed.

FIG. 2 is a transverse sectional view taken substantially through a plane indicated by section line 2—2 in FIG. 1.

FIG. 3 is a partial transverse sectional view taken substantially through a plane indicated by section line 3—3 in FIG. 1.

Referring now to the drawings in detail, it will be observed that the solar lighting device is adapted to be mounted on a building having an exterior roof surface 10 vertically spaced above an interior ceiling surface 12. Associated with the lighting device is an energy receiver component generally referred to by reference numeral 14 interconnected with an energy distributing component 16 by means of an energy conducting component generally referred to by reference numeral 18. The receive component 14 is mounted exteriorly of the building so as to intercept available radiation as indicated by the ray lines 20 in FIG. 1 resulting in the emergence of visible light energy as shown by the light ray lines 22 in FIG. 1 which are reflected downwardly from the interior ceiling surface 12 for illumination purposes. The light energy is accordingly collected within the receiver component 14 and transmitted therefrom along an elongated optical path indicated by the optical axis 24 in FIG. 1 through the conductor component 18 to the distributor component 16 in the form of collimated light, as shown by the lines 26 in FIG. 1.

The receiver component 14 is mounted in fixed spaced relation to the exterior surface 10 by means of a tubular support 28 having a lower mounting flange 30 secured to the building structure in any suitable manner. A vacuum sealing fastener assembly generally referred to by reference numeral 36 includes an annular collar 32 threadedly mounted on the upper end of the tubular support 28 projecting inwardly so as to radially space the tubular support from the conductor component 18 passing therethrough. An O-ring sealing element 44 is seated on the collar and supports the flange 40 at the upper end of the rigid tubing 42 associated with the energy conducting component 18. An annular gasket 38 is disposed between the flange 40 and the neck portion 34 of the receiver component. Annular recesses formed in the neck portion 34 and flange 40 respectively mount transparent sealing discs 45 and 47 arranged to preserve vacuum conditions within the receiver component and the energy conducting component. Also abutting the gasket 38, is an externally threaded base 48 cemented to the neck portion 34 so as to threadedly receive the clamping nut 50 which holds the parts in assembled sealed relation.

The neck portion 34 of the receiver is formed integrally with a dome portion 52 of a housing which is generally circular in cross-section as shown in FIG. 2 and substantially larger in diameter than the neck portion so as to intercept light rays 20 from all directions. Other shapes however, such as elliptical configurations could alternatively be used to suit any particular installation. The housing is made of a light filtering material so as to transmit the visible wavelengths but reflect as much as possible the other undesired radiation wavelengths as indicated by the arrows 54 in FIG. 1. Visible light energy is accordingly collected within the receiver chamber 56 and refracted into a collimated light beam through a refractor element 58 mounted by the neck portion 34 and projecting into the chamber 56. The shape and construction of the receiver component 14 therefore accommodates a uniform flow of visible light energy into the conductor component 18 in the form of collimated light and the transmission of direct solar radiation is minimized. Furthermore, the receiver is easy to clean, resists collection of snow and other debris and offers little resistance to wind. Because of the fastener assembly 36, the vacuum established within the receiver chamber and the tubing of the conductor component, is preserved.

The rigid tubing 42 associated with the conducting component, may include a plurality of elbow portions 60 as shown in FIG. 1 so that an elongated optical path 24 is established between the receiver mounted at a desirable location and an associated distributor component 16 also mounted interiorly where desired. Each elbow portion 60 is accordingly provided with a reflector 62 in order to appropriately re-direct the collimated light 26 along the prescribed path. The collimated light finally emerges from the conductor component and enters the distributor component through a vacuum sealing mounting assembly 64. The mounting assembly 64 includes an annular clamping nut 66 into which the lower end of the rigid tubing 42 projects and to which it is sealed by means of the O-ring sealing element 68 and the connecting flange 70. An annular gasket 72 is clamped between the flange 70 and the neck portion 80 of the distributor component having an externally threaded base 78 cemented thereto engaged by the nut 66. The flange 70 and neck portion 80 are formed with annular recesses to mount transparent sealing discs 71 and 73 for vacuum sealing purposes. An escutcheon 74 is utilized as trim to close the gap between the neck portion of the distributor component and the opening in the ceiling through which it extends.

The transparent housing of which the neck portion 80 is part, also includes a conical portion 82 diverging downwardly from the neck portion 80 below the interior ceiling surface 12 and terminating in a downwardly curved translucent cover portion 84. Centrally mounted in fixed spaced relation to the cover portion 84, is a hemispherical reflector element 86 optically aligned with the outlet end 88 of the conductor tubing 42 so as to receive and reflect the collimated light emerging therefrom. The reflector element will accordingly upwardly reflect the light 22 onto the ceiling surface from which it is downwardly reflected. Also formed in the center of the reflector element 86, is an aperture 90 through which some of the light enters and is dispersed by the light dispersing element 92 cemented to the cover portion 84 of the transparent housing between the supports 94 for the reflector element 86. The light diffusing element 92 regulates the brightness ratio of the distributor.

Thus, the natural lighting device of the present invention will during daylight hours uniformly provide natural illumination with a minimum amount of undesirable radiation. Further, the illumination will be glare-free and its intensity level may be varied as desired. Toward this end, an intensity regulating control 96 as shown by dotted line in FIG. 1 may be associated with the light conducting tubing 42 in order to controllably interrupt or regulate the flow of light energy. It will also be appreciated that the parts and components associated with the lighting device may be easily installed and economically manufactured making the use and installation of the device structurally and economically feasible.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a device for lighting the interior of a building from external radiation having a receiver mounted exteriorly of the building, a distributor mounted interiorly of the building and energy conducting means interconnecting the receiver and distributor, the improvement including means fixedly mounting the receiver in spaced relation to the building for receiving visible radiation from substantially all directions, and sealing means securing the receiver and the distributor to the conducting means to enclose an air evacuated space within the receiver, the conducting means and the distributor, said receiver including a housing having an upper dome portion and a lower neck portion, said housing being made of a light filtering material reflecting light radiation outside the visible wavelength range, and refraction means mounted by the neck portion and projecting into the dome portion of the housing for transmitting visible light radiation in collimated form to the conducting means.

2. The combination of claim 1 wherein said sealing means includes a tubular supporting base cemented to the neck portion of the housing, an annular gasket axially assembled between the neck portion and the conducting means, and fastening means threadedly engaged with the tubular supporting base clamping the neck portion to the conducting means and the receiver mounting means.

3. The combination of claim 2 wherein said receiver mounting means comprises a tubular support radially spaced from the conducting means having a mounting flange at a lower end secured to the building and a spacing flange at an upper end clamped to the conducting means and the receiver.

4. The combination of claim 3 wherein said conducting means includes rigid tubing having connecting flanges at opposite ends clamped to the receiver and the distributor by the sealing means, a plurality of reflectors mounted within the tubing for establishing an elongated optical path for collimated light radiation, and control means for regulating the intensity of the light radiation conducted through the tubing.

5. The combination of claim 4 wherein said distributor comprises a housing having a transparent conical portion connected to the sealing means and a translucent cover portion, a light diffusing element centrally mounted internally of the cover portion, and hemispherical reflective means fixedly mounted in spaced relation on the cover portion for upwardly reflecting collimated light radiation from the conducting means through the conical portion of the distributor, said reflective means having an aperture optically aligned between the conducting means and the light diffusing element.

6. In a device for lighting the interior of a building from external radiation having a receiver mounted exteriorly of the building, a distributor mounted interiorly of the building and energy conducting means interconnecting the receiver and distributor, the improvement including means fixedly mounting the receiver in spaced relation to the building for receiving visible radiation from substantially all directions, and sealing means securing the receiver and the distributor to the conducting means to enclose an air evacuated space within the receiver, the conducting means and the distributor, said distributor comprising a housing having a transparent conical portion connected to the sealing means and a translucent cover portion, a light diffusing element centrally mounted internally on the cover portion, and hemispherical reflective means fixedly mounted in spaced relation on the cover portion for upwardly reflecting collimated light radiation from the conducting means through the conical portion of the distributor, said reflective means having an aperture optically aligned between the conducting means and the light diffusing element.

7. In a device for lighting the interior of a building from external radiation having a receiver mounted exteriorly of the building and energy conducting means connected thereto, said receiver comprising a housing having an upper dome portion and a lower neck portion sealed to the conducting means, said housing being completely made of a light transmissive filtering material reflecting light radiation outside the visible wavelength range, and refraction means mounted by the neck portion and projecting into the dome portion of the housing for transmitting visible light radiation in collimated form through the conducting means.

8. The combination of claim 7 wherein said receiver mounting means comprises a tubular support radially spaced from the conducting means having a mounting flange at a lower end secured to the building and a spacing flange at an upper end clamped to the conducting means and the receiver.

9. In a device for lighting the interior of a building from external radiation having a distributor mounted interiorly of the building and energy conducting means connected thereto, said distributor comprising a housing having a transparent conical portion connected to the conducting means and a translucent cover portion, a light diffusing element centrally mounted internally on the cover portion, and hemispherical reflective means fixedly mounted in spaced relation on the cover portion for upwardly reflecting collimated light radiation from the conducting means through the conical portion of the distributor, said reflective means having an aperture optically aligned between the conducting means and the light diffusing element.

References Cited

UNITED STATES PATENTS

| | | | |
|---|---|---|---|
| 1,254,520 | 1/1918 | Macduff | 350—264 |
| 2,022,144 | 11/1935 | Nicolson | 350—264 |
| 2,918,023 | 12/1959 | Bettcher. | |

JULIA E. COINER, Primary Examiner

U.S. Cl. X.R.

350—264